United States Patent
Vempati et al.

(10) Patent No.: US 12,428,330 B2
(45) Date of Patent: Sep. 30, 2025

(54) PRODUCING FLINT GLASS USING SUBMERGED COMBUSTION MELTING

(71) Applicant: Owens-Brockway Glass Container Inc., Perrysburg, OH (US)

(72) Inventors: Udaya Vempati, Perrysburg, OH (US); William Pinc, Waterville, OH (US); Shane Rashley, Bowling Green, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 662 days.

(21) Appl. No.: 16/788,609

(22) Filed: Feb. 12, 2020

(65) Prior Publication Data
US 2021/0246060 A1 Aug. 12, 2021

(51) Int. Cl.
*C03B 5/235* (2006.01)
*C03B 5/225* (2006.01)
(Continued)

(52) U.S. Cl.
CPC ............ *C03B 5/2356* (2013.01); *C03B 5/225* (2013.01); *C03B 5/2353* (2013.01); *C03B 9/14* (2013.01);
(Continued)

(58) Field of Classification Search
None
See application file for complete search history.

(56) References Cited

U.S. PATENT DOCUMENTS

| | | | |
|---|---|---|---|
| 3,580,714 | A | 5/1971 | Lucek |
| 3,606,825 | A | 9/1971 | Johnson |

(Continued)

FOREIGN PATENT DOCUMENTS

| | | |
|---|---|---|
| CN | 105693070 A | 6/2016 |
| CN | 109970350 A | 7/2019 |

(Continued)

OTHER PUBLICATIONS

PCT Search Report and Written Opinion, Int. Serial No. PCT/US2021/017647, Int. Filing Date: Feb. 11, 2021, Applicant: Owens-Brockway Glass Container Inc., Date of Mailing: Jun. 4, 2021.

(Continued)

*Primary Examiner* — Lisa L Herring

(57) ABSTRACT

A method of producing flint glass using submerged combustion melting is disclosed. The method includes operating a submerged combustion melter such that combustion products are discharged from one or more submerged burners combusting a combustible gas mixture that comprises fuel and oxygen. An oxygen-to-fuel ratio of the combustible gas mixture ranges from stoichiometry to 30% excess oxygen relative to stoichiometry, a temperature of a glass melt in the submerged combustion melter is between 1200° C. and 1500° C., a residence time of the glass melt is maintained between 1 hour and 10 hours, and a specific throughput rate of molten glass discharged from the submerged combustion melter ranges from 2 tons per day per meter squared of cross-sectional area of the submerged combustion melter [tons/day/m²] to 25 tons/day/m². A method of forming glass containers from the molten glass discharged from the melter is also disclosed.

23 Claims, 2 Drawing Sheets

(51) Int. Cl.
*C03B 9/14* (2006.01)
*C03C 3/078* (2006.01)
*C03C 3/087* (2006.01)
*C03C 3/089* (2006.01)
*C03C 3/091* (2006.01)
*C03C 3/112* (2006.01)
*C03C 3/115* (2006.01)
*C03C 3/118* (2006.01)
*C03C 11/00* (2006.01)

(52) U.S. Cl.
CPC .............. *C03C 3/078* (2013.01); *C03C 3/087* (2013.01); *C03C 3/089* (2013.01); *C03C 3/091* (2013.01); *C03C 3/112* (2013.01); *C03C 3/115* (2013.01); *C03C 3/118* (2013.01); *C03C 11/007* (2013.01); *C03B 2211/23* (2013.01); *C03B 2211/40* (2013.01)

(56) References Cited

U.S. PATENT DOCUMENTS

| | | | |
|---|---|---|---|
| 3,732,086 | A | 5/1973 | Heyne |
| 4,539,034 | A | 9/1985 | Hanneken |
| 4,780,121 | A * | 10/1988 | Matesa ................ C03B 5/12 65/135.1 |
| 4,780,122 | A | 10/1988 | Schwenninger et al. |
| 5,922,097 | A * | 7/1999 | Kobayashi ............ C03B 5/235 65/134.1 |
| 6,125,658 | A | 10/2000 | Maugendre et al. |
| 8,196,432 | B2 | 6/2012 | Jacques et al. |
| 8,769,992 | B2 | 7/2014 | Huber |
| 8,973,400 | B2 | 3/2015 | Charbonneau et al. |
| 9,227,865 | B2 | 1/2016 | Shock et al. |
| 9,982,884 | B2 | 5/2018 | Huber et al. |
| 10,336,640 | B2 | 7/2019 | Demott et al. |
| 2004/0168474 | A1 | 9/2004 | Jeanvoine et al. |
| 2004/0206124 | A1 | 10/2004 | Jeanvoine et al. |
| 2004/0224833 | A1 | 11/2004 | Jeanvoine et al. |
| 2007/0212546 | A1 | 9/2007 | Jeanvoine et al. |
| 2008/0256981 | A1 | 10/2008 | Jacques et al. |
| 2008/0276652 | A1 | 11/2008 | Bauer et al. |
| 2010/0251772 | A1 * | 10/2010 | Itoh .................... C03B 5/23 65/157 |
| 2013/0086950 | A1 | 4/2013 | Huber et al. |
| 2014/0007623 | A1 | 1/2014 | Charbonneau |
| 2014/0090419 | A1 | 4/2014 | Charbonneau et al. |
| 2014/0090423 | A1 | 4/2014 | Charbonneau et al. |
| 2014/0356608 | A1 | 12/2014 | Lentes et al. |
| 2015/0135775 | A1 | 5/2015 | Charbonneau et al. |
| 2016/0002084 | A1 | 1/2016 | Charbonneau |
| 2016/0075586 | A1 * | 3/2016 | Charbonneau ............ C22C 5/04 431/160 |
| 2016/0107914 | A1 | 4/2016 | Baker et al. |
| 2016/0145135 | A1 | 5/2016 | Baker |
| 2016/0168001 | A1 | 6/2016 | Demott et al. |
| 2017/0073262 | A1 | 3/2017 | Charbonneau et al. |
| 2017/0259311 | A1 | 9/2017 | Benichou et al. |
| 2018/0105446 | A1 * | 4/2018 | Faulkinbury ......... C03B 5/2356 |
| 2019/0084861 | A1 * | 3/2019 | Takahashi .............. C03B 9/32 |
| 2019/0263712 | A1 | 8/2019 | Charbonneau et al. |
| 2019/0284076 | A1 * | 9/2019 | Wang ................... C03B 5/04 |
| 2019/0284079 | A1 * | 9/2019 | Wang .................... C03C 1/004 |
| 2019/0337833 | A1 | 11/2019 | Charbonneau et al. |
| 2021/0246061 | A1 * | 8/2021 | Vempati ............... C03B 5/2356 |
| 2022/0388884 | A1 | 12/2022 | Weil et al. |

FOREIGN PATENT DOCUMENTS

| | | |
|---|---|---|
| DE | 2825528 A1 | 12/1979 |
| DE | 19644673 A1 | 4/1998 |
| JP | 61127627 A | 6/1986 |
| WO | 9838136 A1 | 9/1998 |
| WO | 2004026776 A1 | 4/2004 |
| WO | 2021067226 A1 | 4/2021 |
| WO | 2021067351 A1 | 4/2021 |
| WO | 2021067356 A1 | 4/2021 |
| WO | 2021163271 A1 | 8/2021 |
| WO | 2021163321 A1 | 8/2021 |

OTHER PUBLICATIONS

EP Office Action, Application No. 21 710 709.3 -1105, Applicant: Owens-Brockway Glass Container Inc., Dated: Feb. 2, 2024.
Canadian Office Action, Application No. 3, 167,840, Applicant: Owens-Brockway Glass Container Inc., Dated: Mar. 18, 2024.
Colombia Office Action, Serial No. NC2022/0011353, Applicant: Owens-Brockway Glass Container Inc., Dated: Apr. 22, 2025.

* cited by examiner

PRODUCING FLINT GLASS USING SUBMERGED COMBUSTION MELTING

The present disclosure is directed to the production of flint glass using submerged combustion technology and, more specifically, to the regulation of certain operating conditions of a submerged combustion melter to facilitate the production of flint glass.

BACKGROUND

Glass is a rigid amorphous solid that has numerous applications. Soda-lime-silica glass, for example, is used extensively to manufacture flat glass articles, such as windows, hollow glass articles including containers such as bottles and jars, as well as tableware and other specialty articles. Soda-lime-silica glass comprises a disordered and spatially crosslinked ternary oxide network of $Na_2O$—$CaO$—$SiO_2$. The silica component ($SiO_2$) is the largest oxide by weight and constitutes the primary network forming material of soda-lime-silica glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance. The inclusion of $Na_2O$ and CaO in the chemistry of soda-lime-silica glass renders the commercial manufacture of glass articles more practical and less energy intensive while still yielding acceptable glass properties. Soda-lime-silica glass, in general and based on the total weight of the glass, has a glass chemical composition that includes 60 wt % to 80 wt % $SiO_2$, 8 wt % to 18 wt % $Na_2O$, and 5 wt % to 15 wt % CaO.

In addition to $SiO_2$, $Na_2O$, and CaO, the glass chemical composition of soda-lime-silica glass may include other oxide and non-oxide materials that act as network formers, network modifiers, colorants, decolorants, redox agents, or other agents that affect the properties of the final glass. Some examples of these additional materials include aluminum oxide ($Al_2O_3$), magnesium oxide (MgO), potassium oxide ($K_2O$), carbon, sulfates, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-glass besides $SiO_2$, $Na_2O$, and CaO, the sum total of those additional materials is preferably 10 wt % or less, or more narrowly 5 wt % or less, based on the total weight of the soda-lime-silica glass.

Soda-lime-silica glass has long been produced in a continuous melting furnace. When operating such a furnace, a vitrifiable feed material—one that is formulated to yield glass with a specific chemical composition and related properties—is fed on top of a large molten glass bath of a generally constant level contained in a melting chamber of the furnace. The molten glass bath is maintained at a temperature of about 1450° C. or greater so that the added feed material can melt, react, and progress through several intermediate melt phases before becoming chemically integrated into the molten glass bath as the bath moves slowly through the melting chamber of the furnace towards a refining chamber located downstream of the melting chamber. In the refining chamber, bubbles and other gaseous inclusions are removed from the molten glass bath to yield chemically homogenized and refined molten glass as needed for further processing. The heat needed to maintain the molten glass bath within the melting chamber has conventionally been supplied by non-submerged burners that combust a mixture of fuel and air/oxygen within an open combustion zone atmosphere located above the molten glass bath. The burners are located in burner ports on opposite sidewalls of the refractory superstructure that partially defines the combustion zone (cross fired furnace) or in a back wall of the refractory superstructure (end port fired furnace). It typically takes 24 hours or longer for feed material to melt and react through a conventional glass melting and fining operation before exiting the melter as a homogeneous molten glass.

The finished glass article—such as a container, flat glass product, or tableware—is sometimes required to be colorless or nearly colorless. Colorless or nearly colorless glass is typically referred to in the industry as "flint" glass. When operating a conventional continuous melting furnace, molten glass that can produce flint glass articles has traditionally been achieved by controlling the compositional recipe of the feed material being supplied to the furnace. This is because certain components of the vitrifiable feed material (e.g., sand, limestone, dolomite, recycled glass, etc.) may contain iron impurities. The iron may be present in two forms within the molten glass: (1) the ferrous or reduced state ($Fe^{2+}$ as FeO) or (2) the ferric or oxidized state ($Fe^{3+}$ as $Fe_2O_3$). Iron in the $Fe^{2+}$ state imparts a blue-green color to the molten glass and iron in the $Fe^{3+}$ states imparts a yellow color. The ratio of $Fe^{2+}$ to total iron ($Fe^{2+}+Fe^{3+}$) in the molten glass determines the redox ratio of the glass and gives a general indication of whether the blue-green color or the yellow color will dominate visually. To that end, the standard approach to deriving flint glass from a conventional continuous melting furnace involves neutralizing the color effects of iron impurities through compositional adjustments to the feed material.

The compositional adjustments to the vitrifiable feed material may include adding redox agents and/or decolorants to the molten glass. Redox agents are compounds that have an oxidizing or reducing effect on the glass and can therefore shift the $Fe^{2+}/Fe^{3+}$ equilibrium towards the $Fe^{3+}$ state or the $Fe^{2+}$ state, respectively, thus altering the redox ratio of the molten glass bath and consequently driving the glass more towards a yellow color or a blue-green color when solidified. A common oxidizing redox agent that can shift the redox ratio downwards is sulfates ($SO_3$), which can be delivered to the molten glass from any of a variety of additive materials that are included in the vitrifiable feed material including, for example, salt cake. Ideally, a redox value of 0.4 or less is sought for flint glass. Decolorants are compounds that absorb visible light in the blue/green wavelengths and transmit visible light in the yellow/red wavelengths to thereby accentuate a colorless appearance of the glass. Several known examples of decolorants include selenium and manganese oxide (as retained in the glass).

Still further, the inclusion of a substantial amount of recycled flint glass in the vitrifiable feed material can dilute the iron impurities contained in the feed material and reduce or altogether eliminate the need to rely on certain redox agents to achieve a low redox ratio. Recycled flint glass can have this effect since it already possesses an inherently colorless or nearly colorless glass chemistry that becomes integrated into the molten glass bath upon melting. Oftentimes, when operating a conventional continuous melting furnace to produce flint glass, the vitrifiable feed material will include some combination of flint recycled glass, redox agents, and decolorants that supports a low redox ratio and masks unwanted color characteristics of the glass. The various operating conditions of a continuous melting furnace have for the most part been selected and controlled for reasons unrelated to the color of the produced glass.

Submerged combustion (SC) melting is a melting technology that is also capable of producing glass, including soda-lime-silica glass, and has recently become a potentially viable alternative to the melting process employed in a conventional continuous melting furnace. Contrary to conventional melting practices, SC melting involves injecting a combustible gas mixture that contains fuel and an oxidant directly into and under the surface of a glass melt contained in a melter, typically though submerged burners mounted in the floor or sidewalls of the melter. The oxidant may be oxygen, air, or any other gas that contains a percentage of oxygen. The combustible gas mixture autoignites and the resultant combustion products cause vigorous stirring and turbulence as they are discharged through the glass melt. The intense shearing forces experienced between the combustion products and the glass melt cause rapid heat transfer and particle dissolution throughout the molten glass compared to the slower kinetics of a conventional melting furnace in which the molten glass bath is heated primarily with radiant heat from overhead non-submerged burners. And while SC technology can melt and integrate the vitrifiable feed material into the glass melt relatively quickly, the glass melt tends to be foamy and have a relatively low-density despite being chemically homogenized when discharged from the melter. Indeed, the glass melt in an SC melter may include anywhere from 30 vol % to 60 vol % of entrained gas bubbles.

The relatively high heat-transfer and mixing efficiency of the SC melter allows for a fundamentally different melter design than that of a conventional continuous melting furnace. Apart from the differences in burner design and location, an SC melter can be smaller than a conventional continuous melting furnace on the order of 50% to 90% in terms of tons of molten glass holding capacity at steady-state. The smaller size of an SC melter makes external cooling both technically and economically feasible. The smaller size of an SC melter and the fact that it can be externally cooled enables the melter to be shut down and emptied, and then restarted, quickly and efficiently when necessitated by production schedules or other considerations. This type of operational flexibility is not practical for a conventional continuous melting furnace. Additionally, the SC melter may include non-submerged burners located above the glass melt to heat and optionally to impinge on the turbulent glass melt surface during SC melter operation to suppress foaming, whereas a conventional continuous melting furnace only uses non-submerged burners for radiant heat transfer.

In the past, SC melting has not been used to manufacture container and float glass articles on a commercial scale. In that regard, there has been little to no interest in adapting SC melting operations to produce flint glass, especially soda-lime-silica flint glass that consistently meets strict color specifications. And the adaption of an SC melter to support the production of soda-lime-silica flint glass articles is not necessarily a straightforward task since legacy vitrifiable feed material formulations tailored to produce flint glass do not translate well to SC melting. The reason for this discrepancy is believed to be related to the fundamentally different way in which the vitrifiable feed material is melted within the turbulent glass melt contained in an SC melter. In SC melting, as explained above, combustion products are discharged from submerged burners directly into the turbulent glass melt, whereas in conventional legacy processes combustion products are discharged into an open atmosphere above a much calmer molten glass bath. A glass production strategy tailored to produce flint glass using SC melting is therefore needed so that the glassmaking operation in an SC melter can be improved and flint glass articles can be reliably manufactured.

SUMMARY OF THE DISCLOSURE

The present disclosure describes a method of producing flint glass in a submerged combustion melter. The disclosed method involves controlling four specific process parameters of the SC melter that have been determined to have at least some influence on promoting flint glass production. The identified SC melter process parameters include (1) the oxygen-to-fuel ratio of the submerged burners, (2) the temperature of the glass melt maintained in the SC melter, (3) the specific throughput rate of molten glass from the SC melter, and (4) the residence time of the glass melt. When each of these SC melter process parameters is maintained within a predetermined range, the glass melt and the molten glass extracted therefrom through an outlet of the SC melter exhibit a colorless or nearly colorless visual appearance. In fact, the molten glass obtained from the SC melter can consistently meet exacting flint glass specifications that are often mandated by the commercial container and flat glass articles industries. The disclosed method is particularly capable of producing soda-lime-silica flint glass for eventual forming into glass containers such as, for example, food and beverage bottles and jars.

The present disclosure embodies a number of aspects that can be implemented separately from or in combination with each other to provide a method for producing flint glass. According to one embodiment of the present disclosure, a method of producing flint glass using a submerged combustion melter is defined. The method includes introducing a vitrifiable feed material into a glass melt contained within a submerged combustion melter that comprises one or more submerged burners. Combustion products are discharged from the one or more submerged burners directly into the glass melt. Moreover, the one or more submerged burners combust a combustible gas mixture that comprises fuel and oxygen, and an oxygen-to-fuel ratio of the combustible gas mixture ranges from stoichiometry to 30% excess oxygen relative to stoichiometry. The method also includes maintaining a temperature of the glass melt between 1200° C. and 1500° C. and maintaining a residence time of the glass melt between 1 hour and 10 hours. Still further, the method includes discharging flint molten glass from the submerged combustion melter at a specific throughput rate that ranges from 2 tons per day per meter squared of cross-sectional area of the submerged combustion melter [tons/day/m$^2$] to 25 tons/day/m$^2$.

According to another aspect of the present disclosure, a method of forming at least one glass container from a glass melt produced in a submerged combustion melter is defined. The method includes introducing a vitrifiable feed material into a glass melt contained within a submerged combustion melter. The submerged combustion melter comprises one or more submerged burners and the vitrifiable feed material is formulated to provide the glass melt with a soda-lime-silica flint glass chemical composition that includes 60 wt % to 80 wt % $SiO_2$, 8 wt % to 18 wt % $Na_2O$, 5 wt % to 15 wt % CaO, and 0 wt % to 2 wt % $Al_2O_3$. The method also includes discharging combustion products from the one or more submerged combustion burners directly into the glass melt, with the one or more submerged burners combusting a combustible gas mixture that comprises fuel and oxygen. An oxygen-to-fuel ratio of the combustible gas mixture ranges from stoichiometry to 30% excess oxygen relative to stoichiometry. The method further calls for maintaining a temperature of the glass melt between 1200° C. and 1500° C. and a residence time of the glass melt between 1 hour and 10 hours. Still further, the method includes discharging flint foamy molten glass from the submerged combustion melter at a specific throughput rate that ranges from 2 tons per day per meter squared of cross-sectional area of the submerged combustion melter [tons/day/$m^2$] to 25 tons/day/$m^2$.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
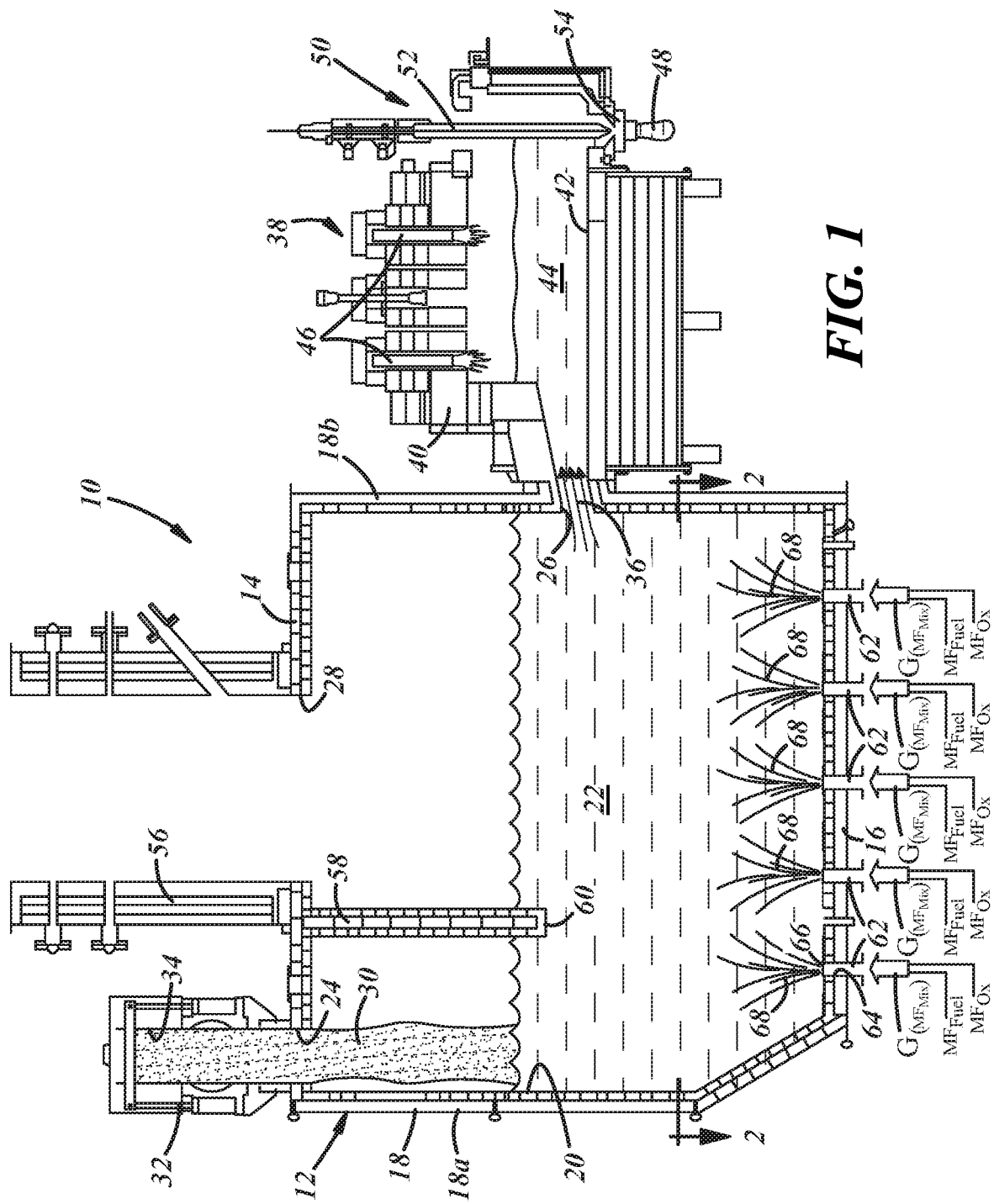
FIG. 1 is an elevated cross-sectional representation of a submerged combustion melter according to one embodiment of the present disclosure.
Figure 2:
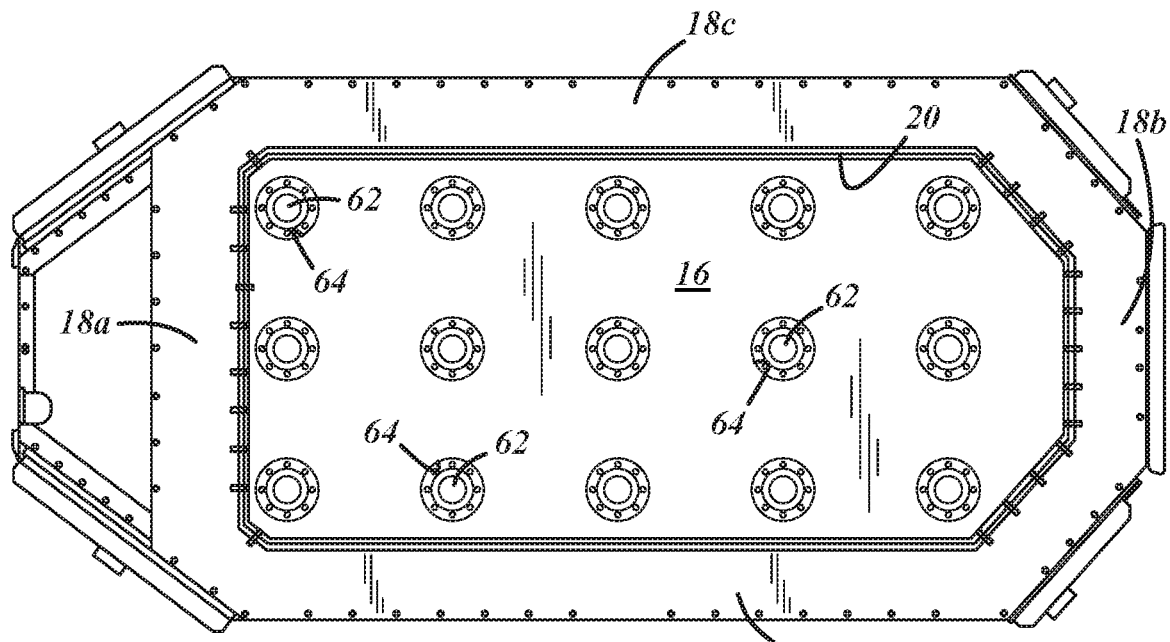
FIG. 2 is a cross-sectional plan view of the submerged combustion melter illustrated in FIG. 1 taken along section line 2-2.

A representative submerged combustion (SC) melter 10 is shown in FIGS. 1-2 to demonstrate the practice of the method for producing molten glass from which flint glass articles can be formed. The SC melter 10 includes a housing 12 that has a roof 14, a floor 16, and a surrounding upstanding wall 18 that connects the roof 14 and the floor 16. The surrounding upstanding wall 18 further includes a front end wall 18a, a rear end wall 18b that opposes and is spaced apart from the front end wall 18a, and two opposed lateral sidewalls 18c, 18d that connect the front end wall 18a and the rear end wall 18b. Together, the roof 14, the floor 16, and the surrounding upstanding wall 18 define an interior reaction chamber 20 of the melter 10 that contains a glass melt 22 when the melter 10 is operational. Each of the roof 14, the floor 16, and the surrounding upstanding wall 18 may be constructed to withstand the high temperature and corrosive nature of the glass melt 22. For example, each of those structures 14, 16, 18 may be constructed from a refractory material or one or more fluid cooled panels that support an interiorly-disposed refractory material having an in-situ formed frozen glass layer (not shown) in contact with the glass melt 22.

The housing 12 of the SC melter 10 defines a feed material inlet 24, a molten glass outlet 26, and an exhaust vent 28. Preferably, as shown best in FIG. 1, the feed material inlet 24 is defined in the roof 14 of the housing 12 proximate the front end wall 18a, and the molten glass outlet 26 is defined in the rear end wall 18b of the housing 12 above the floor 16, although other locations for the feed material inlet 24 and the molten glass outlet 26 are certainly possible. The feed material inlet 24 provides an entrance to the interior reaction chamber 20 for the delivery of a vitrifiable feed material 30. A batch feeder 32 that is configured to introduce a metered amount of the feed material 30 into the interior reaction chamber 20 may be coupled to the housing 12. And while many designs are possible, the batch feeder 32 may, for example, include a rotating screw (not shown) that rotates within a feed tube 34 of a slightly larger diameter that communicates with the feed material inlet 24 to deliver the feed material 30 from a feed hopper into the interior reaction chamber 20 at a controlled rate.

The molten glass outlet 26 provides an exit from the interior reaction chamber 20 for the discharge of foamy molten glass 36 out of the SC melter 10. The discharged foamy molten glass 36 may, as shown, be introduced directly into a stilling vessel 38, if desired. The stilling vessel 38 includes a housing 40 that defines a holding compartment 42. The holding compartment 42 receives the foamy molten glass 36 that is discharged from the interior reaction chamber 20 of the SC melter 10 through the molten glass outlet 26 and maintains an intermediate pool 44 of the molten glass having a constant steady state volume (i.e., ±5 vol %). One or more impingement or non-impingement burners 46 may be mounted in the housing 40 of the stilling vessel 38 to heat the intermediate pool 44 of molten glass and/or suppress or destroy any foam that may accumulate on top of the pool 44 of molten glass. A constant or intermittent flow 48 of molten glass may be dispensed from the intermediate pool 44 of molten glass maintained in the holding compartment 42 and out of the stilling vessel 38 by a spout 50 appended to the housing 40. The spout 50 may have a reciprocal plunger 52 that is operable to controllably dispense the flow 48 of molten glass through an orifice plate 54 so that any downstream equipment, such as a glass finer, can receive a controlled input of molten glass. A more complete description of a stilling vessel that may receive the discharged foamy molten glass 36 is disclosed in U.S. Pub. No. 2021/0094857, which is assigned to the assignee of the present invention and is incorporated herein by reference in its entirety. Of course, in other embodiments, the stilling vessel 38 may be omitted and the foamy molten glass 36 discharged from the interior reaction chamber 20 of the SC melter 10 may be introduced directly into a glass finer or elsewhere.

The exhaust vent 28 is preferably defined in the roof 14 of the housing 12 between the front end wall 18a and the rear end wall 18b at a location downstream from the feed material inlet 24. An exhaust duct 56 communicates with the exhaust vent 28 and is configured to remove gaseous compounds from the interior reaction chamber 20. The gaseous compounds removed through the exhaust duct 56 may be treated, recycled, or otherwise managed away from the SC melter 10 as needed. To help prevent or at least minimize the loss of some of the feed material 30 through the exhaust vent 28 as unintentional feed material castoff, a partition wall 58 that depends from the roof 14 of the housing 12 may be positioned between the feed material inlet 24 and the exhaust vent 28. The partition wall 58 may include a lower free end 60 that is submerged within the glass melt 22, as illustrated, or it may be positioned close to, but above, the glass melt 22. The partition wall 58 may be constructed similarly to the roof 14, the floor 16, and the surrounding upstanding wall 18, but it does not necessarily have to be so constructed.

The SC melter 10 includes one or more submerged burners 62. Each of the one or more submerged burners 62 is mounted in a port 64 defined in the floor 14 (as shown)

and/or the surrounding upstanding wall 18 at a location immersed by the glass melt 22. Each of the submerged burner(s) 62 forcibly injects a combustible gas mixture G into the glass melt 22 through an output nozzle 66. The combustible gas mixture G comprises fuel and oxygen. The fuel supplied to the submerged burner(s) 62 is preferably methane or propane, and the oxygen may be supplied as pure oxygen, in which case the burner(s) 62 are oxy-fuel burners, or it may be supplied as a component of air or an oxygen-enriched gas that includes at least 20 vol % and, preferably, at least 50 vol % $O_2$. Upon being injected into the glass melt 22, the combustible gas mixture G immediately autoignites to produce combustion products 68—namely, $CO_2$, CO, $H_2O$, and any uncombusted fuel, oxygen, and/or other gas compounds such as nitrogen—that are discharged into and through the glass melt 22. Anywhere from five to thirty submerged burners 62 are typically installed in the SC melter 10 although more or less burners 62 may certainly be employed depending on the size and melt capacity of the melter 10.

The combustible gas mixture G is supplied to and injected from each of the submerged burner(s) 62 at a mass flow rate $MF_{Mix}$. The mass flow rate $MF_{Mix}$ of the combustible gas mixture G at each burner 62 comprises a mass flow rate of oxygen $MF_{Ox}$ and a mass flow rate of fuel $MF_{Fuel}$, which may be a mass flow rate of methane $MF_{Meth}$ or a mass flow rate of propane $MF_{Prop}$, plus mass flow rates of other gases such as nitrogen or another inert gas if the oxygen is supplied via air or an oxygen-enriched gas. In terms of supplying the submerged burner(s) 62 with the combustible gas mixture G at the appropriate overall mass flow rate $MF_{Mix}$ as well as the appropriate mixture of oxygen and fuel flow rates $MF_{Ox}$, $MF_{Fuel}$, each of the burner(s) 62 may be fluidly coupled to an oxidant (oxygen, oxygen-enriched gas, or air) supply manifold and a fuel supply manifold by a flow conduit that is equipped with sensors and valves to allow for precise control of the mass flow rates $MF_{Mix}$, $MF_{Ox}$, $MF_{Fuel}$ to the burner(s) 62 and injected through the burner nozzle(s) 66.

The SC melter 10 is operated in accordance with the present disclosure to ensure that the glass melt 22 contained within the interior reaction chamber 20 of the SC melter 10 and the foamy molten glass 36 discharged from the interior reaction chamber 20 through the molten glass outlet 26 are colorless or nearly colorless so that flint glass articles that meet applicable color specifications can be formed therefrom. Flint soda-lime-silica glass, for instance, is visually transparent when solidified to a room temperature (i.e., 25° C.) viscosity. The visual transparency of flint glass is demonstrated by a dominant wavelength that lies between 572 nm and 578 nm, a brightness above 50%, and a purity below 16%. These three color specifications are measurable by a UV-Vis spectrometer using the standard illuminant C, with a 2 degree observer and sample thickness of 38 mm, according to the method of ASTM E308 (the American Society of Testing Materials). Flint soda-lime-silica molten glass that can meet these color specifications when solidified can be refined, conditioned, and formed into glass containers downstream of the SC melter 10, as will be further described below in connection with FIG. 3.

During operation of the SC melter 10, each of the one or more submerged burners 62 individually discharges combustion products 68 directly into and through the glass melt 22. The glass melt 22 is a volume of molten glass that often weighs between 1 US ton (1 US ton=2,000 lbs) and 100 US tons and is generally maintained at a constant volume during steady-state operation of the SC melter 10. As the combustion products 68 are thrust into and through the glass melt 22, which creates complex flow patterns and severe turbulence, the glass melt 22 is vigorously agitated and experiences rapid heat transfer and intense shearing forces. The combustion products 68 eventually escape the glass melt 22 and are removed from the interior reaction chamber 20 through the exhaust vent 28 along with any other gaseous compounds that may volatilize out of the glass melt 22. Additionally, in some circumstances, one or more non-submerged burners (not shown) may be mounted in the roof 14 and/or the surrounding upstanding wall 18 at a location above the glass melt 22 to provide heat to the glass melt 22, either directly by flame impingement or indirectly through radiant heat transfer, and to also facilitate foam suppression and/or destruction.

While the one or more submerged burners 62 are being fired into the glass melt 22, the vitrifiable feed material 30 is controllably introduced into the interior reaction chamber 20 through the feed material inlet 24. The vitrifiable feed material 30 introduced into the interior reaction chamber 20 is formulated to assimilate into the glass melt 22 and provide the melt 22 with a glass chemical composition upon melting. For example, if soda-lime-silica flint glass is being made, the feed material 30 may be a physical mixture of virgin raw materials and optionally cullet (i.e., recycled glass) that provides a source of $SiO_2$, $Na_2O$, and CaO in the correct proportions along with any of the other materials listed below in Table 1 such as $Al_2O_3$, $SO_3$, selenium, and $MnO_2$, to name but a few. The exact constituent materials that constitute the vitrifiable feed material 30 is subject to much variation while still being able to achieve the soda-lime-silica glass chemical composition of the flint variety as is generally well known in the glass manufacturing industry.

TABLE 1

| Glass Chemical Composition of Soda-Lime-Silica Flint Glass | | |
|---|---|---|
| Component | Weight % | Raw Material Sources |
| $SiO_2$ | 60-80 | Quartz sand |
| $Na_2O$ | 8-18 | Soda ash |
| CaO | 5-15 | Limestone |
| $Al_2O_3$ | 0-2 | Nepheline Syneite, Feldspar |
| MgO | 0-5 | Magnesite |
| $K_2O$ | 0-3 | Potash |
| $Fe_2O_3$ + FeO | 0-0.08 | Iron is a contaminant |
| $MnO_2$ | 0-0.3 | Manganese Dioxide |
| $SO_3$ | 0-0.5 | Salt Cake, Slag |
| Se | 0-0.0005 | Selenium |
| F | 0-0.5 | Fluorines are a contaminant |

For example, to achieve a soda-lime-silica flint glass chemical composition in the glass melt 22, the feed material 30 may include primary virgin raw materials such as quartz sand (crystalline $SiO_2$), soda ash ($Na_2CO_3$), and limestone ($CaCO_3$) in the quantities needed to provide the requisite proportions of $SiO_2$, $Na_2O$, and CaO, respectively. Other virgin raw materials may also be included in the vitrifiable feed material 30 to contribute one or more of $SiO_2$, $Na_2O$, CaO and possibly other oxide and/or non-oxide materials in the glass melt 22 depending on the chemistry of the soda-lime-silica flint glass chemical composition being produced. These other virgin raw materials may include feldspar, dolomite, and calumite slag. Additionally, the feed material 30 may include secondary or minor virgin raw materials that provide the soda-lime-silica flint glass chemical composition with decolorants and/or redox agents that may be needed, and may further provide a source of chemical fining agents to assist with downstream bubble removal. The vitrifiable feed material 30 may even include up to 80 wt % cullet with the remainder typically being entirely or mostly virgin raw materials depending on a variety of factors.

The vitrifiable feed material 30 does not form a batch blanket that rests on top of the glass melt 22 as is customary in a conventional continuous melting furnace, but, rather, is rapidly disbanded and consumed by the turbulent glass melt 22. The dispersed feed material 30 is subjected to intense heat transfer and rapid particle dissolution throughout the glass melt 22 due to the vigorous melt agitation and shearing forces caused by the submerged burner(s) 62. This causes the feed material 30 to quickly mix, react, and become chemically integrated into the glass melt 22. However, the agitation and stirring of the glass melt 22 by the discharge of the combustion products 68 from the submerged burner(s) 62 also promotes bubble formation within the glass melt 22. Consequently, the glass melt 22 is foamy in nature and includes a homogeneous distribution of entrained gas bubbles. The entrained gas bubbles may account for 30 vol % to 60 vol % of the glass melt 22, which renders the density of the glass melt 22 relatively low, typically ranging from 0.75 gm/cm$^3$ to 1.5 gm/cm$^3$ or, more narrowly, from 0.99 gm/cm$^3$ to 1.3 gm/cm$^3$, for soda-lime-silica glass. The gaseous inclusions entrained within the glass melt 22 vary in size and may contain any of several gases including $CO_2$, $H_2O$ (vapor), $N_2$, $SO_2$, $CH_4$, $CO$, and volatile organic compounds (VOCs).

The foamy molten glass 36 discharged from the SC melter 10 through the molten glass outlet 26 is drawn from the glass melt 22 and is chemically homogenized to the desired glass chemical composition, e.g., a soda-lime-silica flint glass chemical composition, but with the same relatively low density and entrained volume of gas bubbles as the glass melt 22. The foamy molten glass 36 is eventually directed to additional downstream equipment—with or without first being collected in the holding compartment 42 of the stilling vessel 38—such as an individual section forming machine as applicable to glass containers for additional processing into glass articles. The glass melt 22 and the foamy molten glass 36 discharged from the SC melter 10 can be formed into glass articles that meet flint glass color specifications under steady-state operation of the SC melter 10 by controlling four operating conditions of the SC melter 10. The identified SC melter operating conditions include: (1) the oxygen-to-fuel ratio of the combustible gas mixture G supplied to each of the one or more submerged burners 62; (2) the temperature of the glass melt 22 maintained in the interior reaction chamber 20 of the SC melter 10; (3) the specific throughput rate of the foamy molten glass 36 discharged from the SC melter 10; and (4) the residence time of the glass melt 22.

For each of the one or more submerged burners 62, the oxygen-to-fuel ratio of the combustible gas mixture G refers to the ratio of the mass flow rate of oxygen $MF_{Ox}$ (whether that be a flow rate of pure oxygen or a flow rate of oxygen within a gas, such as air, that contains oxygen) to the mass flow rate of fuel $MF_{Fuel}$ within the mass flow rate $MF_{Mix}$ of the combustible gas mixture G relative to stoichiometry, as represented below in equation (1).

$$\text{Oxygen-to-Fuel Ratio} = \frac{MF_{Ox}}{MF_{Fuel}} \quad \text{Eq. 1}$$

Stoichiometry is defined as the mass flow rate of oxygen $MF_{Ox}$ and the mass flow rate of the fuel $MF_{Fuel}$ that are theoretically needed to fully consume each of the oxygen and fuel flows in the combustion reaction without yielding an excess of either constituent. For example, if methane is used as the fuel, stoichiometry would dictate that the mass flow rate of oxygen $MF_{Ox}$ and the mass flow rate of methane $MF_{Meth}$ as combined in the combustible gas mixture G satisfy the relationship $MF_{Ox}=4.0(MF_{Meth})$. In another example, if propane is used as the fuel, stoichiometry would dictate that the mass flow rate of oxygen $MF_{Ox}$ and the mass flow rate of propane $MF_{Prop}$ as combined in the combustible gas mixture G satisfy the relationship $MF_{Ox}=3.63(MF_{Prop})$. The combustible gas mixture G injected from each of the submerged burners 62 may be at stoichiometry, may contain excess oxygen (lean) relative to stoichiometry, or may contain excess fuel (rich) relative to stoichiometry.

When supplying the submerged burner(s) 62 with excess oxygen or excess fuel, the oxygen-to-fuel ratio may be expressed as a percentage in excess of (or above) stoichiometry. For example, and returning to the examples above, operating the submerged burners 62 at 10% excess oxygen would mean that the mass flow rate of oxygen $MF_{Ox}$ at each of the burners 62 would be $MF_{Ox}=4.4(MF_{Meth})$ when the fuel is methane and $MF_{Ox}=3.99(MF_{Prop})$ when the fuel is propane. The oxygen-to-fuel ratio of the combustible gas mixture G supplied to each of the submerged burners 62 can be controlled by adjusting the flow rates of the oxygen and/or the fuel being supplied to the burners 62. Such adjustments can be performed through known automated control systems or by manual action. Here, in the presently disclosed method, the oxygen-to-fuel ratio of the combustible gas mixture G supplied to each submerged burner 62 may range from stoichiometry (i.e., 0% excess oxygen and 0% excess fuel) to 30% excess oxygen relative to stoichiometry or, more narrowly, from 15% excess oxygen to 25% excess oxygen relative to stoichiometry.

The oxygen-to-fuel ratio of the combustible gas mixture G at each of the submerged burner(s) 62 can influence the redox ratio of the glass melt 22 by altering the chemistry of the melt 22. If the oxygen-to-fuel ratio of the combustible gas mixture G being injected by the submerged burner(s) 62 is at stoichiometry, the combustion products 68 discharged into and through the glass melt 22 contain only $CO_2$ and $H_2O$ (and possibly unreacted inert gases such as $N_2$ if the burner(s) 62 are fed with air) along with no more than a negligible amount of other byproduct compounds. If the oxygen-to-fuel ratio is increased to above stoichiometry, excess oxygen will be contained within the combustion products 68 and discharged through the glass melt 22. Because the combustion products 68 discharged from each submerged burner 62 transfer heat and momentum to the glass melt 22 through intimate shearing contact, a change in the composition of the combustion products 68 initiated through change in the oxygen-to-fuel ratio of the combustible gas mixture G fed to the submerged burner(s) 62 can shift the redox ratio of the melt 22.

The oxygen-to-fuel ratio of the combustible gas mixture G and the redox ratio of the glass melt 22 are inversely related. Increasing the oxygen-to-fuel ratio of the combustible gas mixture G injected by the submerged burner(s) 62 to include excess oxygen above stoichiometry has an oxidizing effect on the glass melt 22 and, consequently, decreases the redox ratio of the glass melt 22 by decreasing the amount of $Fe^{2+}$ relative to $Fe^{3+}$. This is because the excess uncombusted oxygen included in the combustion products 68 is free to react with and neutralize reducing agents in the glass melt 22. The excess oxygen may react with FeO ($Fe^{2+}$) to form $Fe_2O_3$ ($Fe^{3+}$), sulfides to form sulfites or sulfates, carbon to form CO and/or $CO_2$, as well as other reducing agents that may be present in the glass melt 22. All of these reactions shift the redox ratio of the glass melt 22 downwards either directly or indirectly.

The temperature of the glass melt 22 refers to the bulk average temperature of the melt 22. This temperature can be determined in one of several ways. For instance, the temperature of the glass melt 22 may be determined by taking a plurality of temperature measurements throughout the glass melt 22 and then averaging those measurements to obtain an arithmetic mean temperature. Anywhere from two to ten temperature measurements may be taken from various distributed locations within the melt 22 and used to compile the bulk average temperature of the glass melt 22 in this way. Alternatively, the temperature of the glass melt 22 can be determined by taking a single temperature measurement at a location within the melt 22 that is known or has been deemed to reflect the bulk average temperature of the melt 22. And, still further, the bulk average temperature of the glass melt 22 may be determined indirectly through modeling or calculations based on other measurements related to the glass melt 22. The temperature of the glass melt 22 is dependent on the total flow of the combustion products 68 into and through the glass melt 22 as well as the weight of the glass melt 22 and, accordingly, can be adjusted as needed by increasing or decreasing these parameters. In the presently disclosed method, the temperature of the glass melt 22 is controlled to range from 1200° C. to 1500° C. or, more narrowly, from 1330° C. to 1380° C. Excessive glass temperatures in the glass melt 22 can increase the volatilization rate of certain species in the glass including, for example, selenium. Because selenium masks the impact of iron impurities on the color of the glass, a loss of selenium may cause the color of the glass to shift towards the blue/green color brought on by iron, which may take the glass out of its flint color specification range alone or in combination with other glass properties.

The specific throughput rate of the molten glass 36 from the SC melter 10 refers to the quantity of foamy molten glass 36 discharged from the SC melter 10 in mass per unit of time per unit of cross-sectional area of the interior reaction chamber 20 at the height of the molten glass outlet 26. In other words, the specific throughput rate is the mass flow rate or mass throughput rate of the foamy molten glass 36 discharged from the SC melter 10 through the molten glass outlet 26 ($MF_{Discharged\ Glass}$), which may be reported in US tons per day (tons/day), divided by the cross-sectional area of the interior reaction chamber 20 at the height of the molten glass outlet 26 ($CA_{Melter}$), which may be reported in meters-squared ($m^2$), as represented below in Equation (2).

$$\text{Specific Throughput Rate} = \frac{MF_{Discharged\ Glass}}{CA_{Melter}} \quad \text{Eq. 2}$$

$$\text{Typically reported in} \left(\frac{\text{Tons}}{\text{day} \times m^2}\right) \text{ or } (\text{tons/day}/m^2)$$

The units of the specific throughput rate of the foamy molten glass 36 are typically reported in tons/day/$m^2$ as indicated above and can easily be calculated from any other units of weight, time, and area by simple mathematical conversions. The specific throughput rate of the molten glass 36 can be adjusted upwardly or downwardly by increasing or decreasing, respectively, the mass flow rate of the molten glass 36 being discharged from the SC melter 10 given a set cross-sectional area of the interior reaction chamber 20. To that end, when designing the SC melter 10, care should be taken to ensure that the cross-sectional area of the interior reaction chamber 20 is not too large or too small that the desired specific throughput rate of the molten glass 36 cannot be obtained using the intended range of mass flow rates for the discharged molten glass 36. In the presently disclosed method, the specific throughput rate of the foamy molten glass 36 being discharged from the SC melter 10 is controlled to range from 2 tons/day/$m^2$ to 25 tons/day/$m^2$ or, more narrowly, from 6 tons/day/$m^2$ to 12 tons/day/$m^2$.

The residence time of the glass melt 22 refers to the theoretical average amount of time a unit of weight of the glass melt 22 spends in the interior reaction chamber 20 before being discharged from the SC melter 10 as foamy molten glass 36. The residence time provides a rough indication of how long it takes for a unit of weight of the vitrifiable feed material 30 to become chemically integrated into and cycle through the glass melt 22 starting from the time the unit of feed material is introduced into the interior reaction chamber 20 to the time the unit of feed material is discharged from the chamber 20 as an equivalent unit of foamy molten glass 36. To calculate the residence time of the glass melt 22, the weight of the glass melt 22 ($W_{Glass\ Melt}$) contained within the interior reaction chamber 20 is divided by the mass flow rate of the foamy molten glass 36 being discharged from the SC melter 10 through the molten glass outlet 26 ($MF_{Discharged\ Glass}$) as represented below in Equation (3).

$$\text{Residence Time} = \frac{W_{Glass\ Melt}}{MF_{Discharge\ Glass}}$$

The residence time of the glass melt 22 can be adjusted by increasing or decreasing the mass flow rate of the foamy molten glass 36 being discharged from the SC melter 10 and/or by increasing or decreasing the weight the glass melt 22 contained in the interior reaction chamber 20. In the presently disclosed method, the residence time of the glass melt 22 is controlled to range from 1 hour to 10 hours or, more narrowly, from 2 hours to 4 hours.

The residence time of the glass melt 22 can influence the redox ratio of the glass melt 22 by affecting the volatilization of volatile compounds in the melt 22. Molten glass in general contains a number of volatile compounds including, most notably, sulfates, which volatilize into gases over time. The volatilization typically occurs at melt/gas interfaces. To that end, in a conventional continuous melting furnace, most of the volatilization of volatile compounds occurs at the surface of the molten glass bath or in the immediate vicinity of bubbles contained in the glass bath as a result of trapped air or reactions involving the feed material. The volatilization mechanism is much different and much more rapid in submerged combustion melting. Not only are the combustion products 68 discharged from the submerged burner(s) 62 fired directly into and through the glass melt 22, but the amount of bubbles entrained within the glass melt 22 is much greater compared to a molten glass bath in a conventional continuous melting furnace. As a result, the volatilization of volatile compounds occurs more rapidly in the glass melt 22 of the SC melter 10 than in a conventional continuous melting furnace and is much more sensitive to changes in residence time.

The residence time of the glass melt 22 is directly proportional to the extent of volatilization of any volatile compounds, particularly sulfates, that are contained in the glass melt 22. When the residence time is increased, the extent of volatilization of the volatile compounds increases, and less of the volatile compounds are retained in the glass melt 22 and the glass produced therefrom. In the case of sulfates, for instance, an increase in the residence time of the glass melt 22 causes increased volatilization of the sulfates and, consequently, a decrease in the amount of retained sulfates, expressed as $SO_3$, in the glass melt 22. And since $SO_3$ acts as an oxidizing agent, a decrease in the amount of retained sulfates in the glass melt 22 renders the melt 22 more reduced and thus increases the redox ratio of the melt 22. Conversely, when the residence time is decreased, the extent of volatilization of the volatile compounds decreases, and more of the volatile compounds are retained in the glass melt and the glass produced therefrom. Referring again to the case of sulfates, a decrease in the residence time of the glass melt causes reduced volatilization of the sulfates and, consequently, an increase in the amount of retained sulfates in the glass melt. This renders the glass melt 22 more oxidized and thus decreases the redox ratio of the melt 22.

By regulating each of the oxygen-to-fuel ratio of the combustible gas mixture G supplied to each of the one or more submerged burners 62, the temperature of the glass melt 22 maintained in the interior reaction chamber 20 of the SC melter 10, the specific throughput rate of the foamy molten glass 36 discharged from the SC melter 10, and the residence time of the glass melt 22 as indicated above, the redox ratio of the glass melt 22 and the glass chemical composition of the glass melt 22 are coordinated to ensure that glass articles that satisfy flint glass color specifications can be reliably produced from the foamy molten glass 36 discharged from the SC melter 10. The operating conditions of the SC melter 10 are believed to have an oxidizing effect on the glass melt 22 and the foamy molten glass 36. In that regard, the need to include oxidizing agents, such as sulfates, in the vitrifiable feed material 30 may be reduced or even eliminated entirely since the operating condition(s) are able to perform essentially the same function, which in turn can reduce batch costs, preserve raw materials, and reduce $SO_x$ emissions from the SC melter 10.

Figure 3:
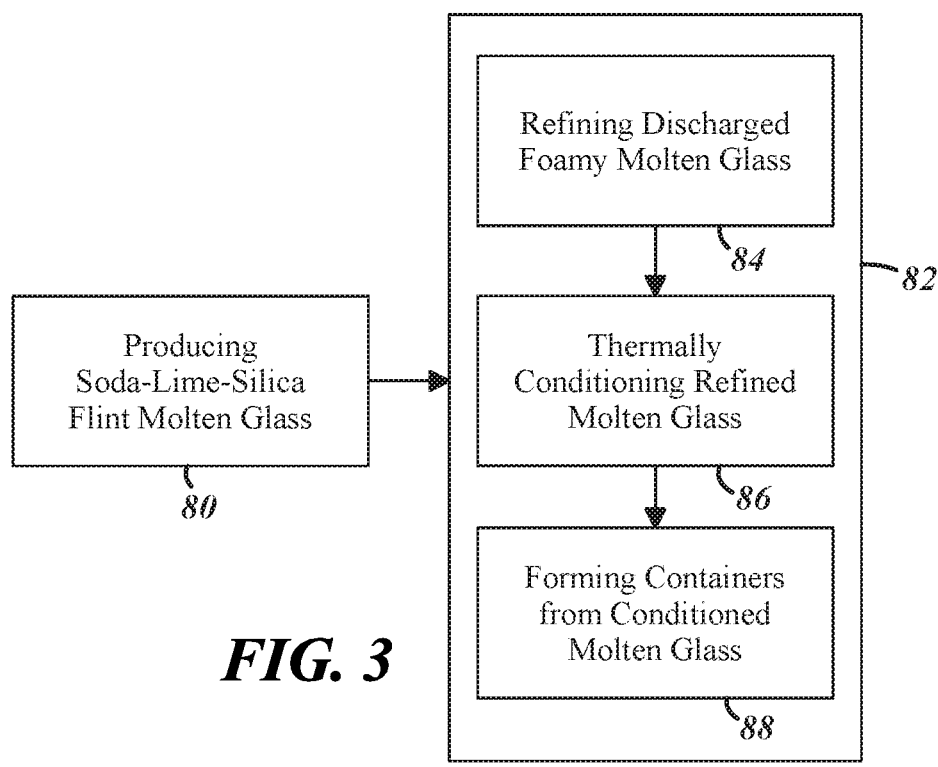
FIG. 3 is a schematic flow diagram of a process for producing flint glass in a submerged combustion melter and then forming glass containers from the flint glass according to one embodiment of the present disclosure.

As mentioned above, the foamy molten glass 36 discharged from the SC melter 10, which can produce glass articles that meet the specifications for flint glass, may be further processed downstream of the SC melter 10. For instance, and referring now to FIG. 3, the foamy molten glass 36 may have a soda-lime-silica flint glass chemical composition and be formed into glass containers. In FIG. 3, the step of producing molten glass having such a chemical composition, step 80, involves the use and operation of the SC melter 10, as described above, to provide the discharged foamy molten glass 36 for further processing, regardless of whether or not the discharged foamy molten glass 36 is temporarily held in the stilling vessel 38 after exiting the SC melter 10. Next, in step 82, the foamy molten glass 36 discharged from the SC melter 10 is formed into at least one, and preferably many, glass containers. The forming step 82 includes a refining step 84, a thermal conditioning step 86, and a forming step 88. These various sub-steps 84, 86, 88 of the forming step 82 can be carried out by any suitable practice including the use of conventional equipment and techniques.

The refining step 84 involves removing bubbles, seeds, and other gaseous inclusions from the foamy molten glass 36 so that the glass containers formed therefrom do not contain more than a commercially-acceptable amount of visual glass imperfections. To carry out such refining, the foamy molten glass 36 may be introduced into a molten glass bath contained within a fining chamber of a finer tank. The molten glass bath flows from an inlet end of the finer tank to an outlet end and is heated along that path by any of a wide variety of burners—most notably, flat flame overhead burners, sidewall pencil burners, overhead impingement burners, etc.—to increase the viscosity of the molten glass bath which, in turn, promotes the ascension and bursting of entrained bubbles. In many cases, the molten glass bath in the fining chamber is heated to a temperature between 1400° C. to 1500° C. Additionally, chemical fining agents, if included in the vitrifiable feed material 30, may further facilitate bubble removal within the molten glass bath. Commonly used fining agents include sulfates that decompose to form $O_2$. The $O_2$ then readily ascends through the molten glass bath collecting smaller entrained bubbles along the way. As a result of the refining process that occurs in the finer tank, the molten glass bath typically has a density that ranges from 2.3 gm/cm$^3$ to 2.5 gm/cm$^3$ for soda-lime-silica glass at the outlet end of the finer tank, thus refining the discharged foamy molten glass 36 into a refined molten glass.

The refined molten glass attained in the fining chamber is then thermally conditioned in the thermal conditioning step 86. This involves cooling the refined molten glass at a controlled rate to a temperature and viscosity suitable for glass forming operations while also achieving a more uniform temperature profile within the refined molten glass. The refined molten glass is preferably cooled to a temperature between 1050° C. to 1200° C. to provide conditioned molten glass. The thermal conditioning of the refined molten glass may be performed in a separate forehearth that receives the refined molten glass from the outlet end of the finer tank. A forehearth is an elongated structure that defines an extended channel along which overhead and/or sidewall mounted burners can consistently and smoothly reduce the temperature of the flowing refined molten glass. In another embodiment, however, the fining and thermal conditioning steps 84, 86 may be performed in a single structure that can accommodate both fining of the foamy molten glass 36 and thermal conditioning of the refined molten glass.

Glass containers are then formed or molded from the conditioned molten glass in the forming step 88. In a standard container-forming process, the conditioned molten glass is discharged from a glass feeder at the end of the finer/forehearth as molten glass streams or runners. The molten glass runners are sheared into individual gobs of a predetermined weight. Each gob falls into a gob delivery system and is directed into a blank mold of a glass container forming machine. Once in the blank mold, and with its temperature still between 1050° C. and about 1200° C., the molten glass gob is pressed or blown into a parison or preform that includes a tubular wall. The parison is then transferred from the blank mold into a blow mold of the forming machine for final shaping into a container. Once the parison is received in the blow mold, the blow mold is closed and the parison is blown rapidly into the final container shape that matches the contour of the mold cavity using a compressed gas such as compressed air. Other approaches may of course be implemented to form the glass containers besides the press-and-blow and blow-and-blow forming techniques including, for instance, compression or other molding techniques.

The container formed within the blow mold has an axially closed base and a circumferential wall. The circumferential wall extends from the axially closed base to a mouth that defines an opening to a containment space defined by the axially closed base and the circumferential wall. The formed glass container is allowed to cool while in contact with the mold walls and is then removed from the blow mold and placed on a conveyor or other transport device. The glass container is then reheated and cooled at a controlled rate in an annealing lehr to relax thermally-induced strain and remove internal stress points. The annealing of the glass container involves heating the glass container to a temperature above the annealing point of the soda-lime-silica glass chemical composition, which usually lies within the range of 510° C. to 550° C., followed by slowly cooling the container at a rate of 1° C./min to 10° C./min to a temperature below the strain point of the soda-lime-silica glass, which typically falls within the range of 470° C. to 500° C. The glass container may be cooled rapidly after it has been cooled to a temperature below the strain point. Moreover, any of a variety of coatings may be applied to the surface of the glass container either before (hot-end coatings) or after (cold-end coatings) annealing for a variety of reasons.

There thus has been disclosed a method of producing flint molten glass using submerged combustion melting technology that satisfies one or more of the objects and aims previously set forth. The flint molten glass may be further processed into glass articles including, for example, glass containers. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method comprising:
   introducing a vitrifiable feed material into a glass melt contained within a submerged combustion melter, the submerged combustion melter comprising one or more submerged burners;
   discharging combustion products from the one or more submerged burners directly into the glass melt, the one or more submerged burners combusting a combustible gas mixture that comprises fuel and oxygen, and wherein an oxygen-to-fuel ratio of the combustible gas mixture ranges from stoichiometry to 30% excess oxygen relative to stoichiometry;
   maintaining a temperature of the glass melt between 1200° C. and 1500° C.;
   maintaining a residence time of the glass melt between 1 hour and 10 hours;
   discharging a flint molten glass from the submerged combustion melter at a specific throughput rate that ranges from 2 tons per day per meter squared of cross-sectional area of the submerged combustion melter [tons/day/m²] to 25 tons/day/m²;
   refining the flint molten glass discharged from the submerged combustion melter to obtain refined molten glass;
   thermally conditioning the refined molten glass to produce conditioned molten glass; and
   forming a glass container from the conditioned molten glass.

2. The method set forth in claim 1, wherein the oxygen-to-fuel ratio ranges from 15% excess oxygen relative to stoichiometry to 25% excess oxygen relative to stoichiometry.

3. The method set forth in claim 1, wherein the temperature of the glass melt ranges from 1330° C. to 1380° C.

4. The method set forth in claim 1, wherein the residence time of the glass melt ranges from 2 hours to 4 hours.

5. The method set forth in claim 1, wherein the specific throughput rate of the flint molten glass discharged from the submerged combustion melter ranges from 6 tons/day/m² to 12 tons/day/m².

6. The method set forth in claim 1, wherein the oxygen-to-fuel ratio ranges from 15% excess oxygen relative to stoichiometry to 25% excess oxygen relative to stoichiometry, the temperature of the glass melt ranges from 1330° C. to 1380° C., the residence time of the glass melt ranges from 2 hours to 4 hours, and the specific throughput rate of the flint molten glass discharged from the submerged combustion melter ranges from 6 tons/day/m² to 12 tons/day/m².

7. The method set forth in claim 1, wherein the flint molten glass discharged from the submerged combustion melter has a density of 0.75 gm/cm³ to 1.5 gm/cm³.

8. The method set forth in claim 1, wherein the glass container meets flint glass specifications of a dominant wavelength that lies between 572 nm and 578 nm, a brightness above 50%, and a purity below 16%.

9. The method set forth in claim 1, wherein the flint molten glass has a chemical composition that includes 60 wt % to 80 wt % $SiO_2$, 8 wt % to 18 wt % $Na_2O$, and 5 wt % to 15 wt % CaO.

10. The method set forth in claim 9, wherein refining the flint molten glass discharged from the submerged combustion melter comprises refining the flint molten glass at a temperature between 1400° C. and 1500° C., the refined molten glass having a density that ranges from 2.3 gm/cm³ to 2.5 gm/cm³; wherein thermally conditioning the refined molten glass produces the conditioned molten glass with a temperature between 1050° C. and 1200° C.; and wherein forming the glass container comprises delivering a molten glass gob of the conditioned molten glass into a glass container forming machine and forming a glass container from the molten glass gob.

11. The method set forth in claim 1, wherein the flint molten glass discharged from the submerged combustion melter has a redox value of 0.4 or less.

12. The method set forth in claim 1, wherein the vitrified feed material includes up to 80 wt % cullet.

13. A method comprising:
   introducing a vitrifiable feed material into a glass melt contained within a submerged combustion melter, the submerged combustion melter comprising one or more submerged burners and the vitrifiable feed material being formulated to provide the glass melt with a soda-lime-silica flint glass chemical composition that includes 60 wt % to 80 wt % $SiO_2$, 8 wt % to 18 wt % $Na_2O$, 5 wt % to 15 wt % CaO, and 0 wt % to 2 wt % $Al_2O_3$;
   discharging combustion products from the one or more submerged burners directly into the glass melt, the one or more submerged burners combusting a combustible gas mixture that comprises fuel and oxygen, wherein an oxygen-to-fuel ratio of the combustible gas mixture ranges from stoichiometry to 30% excess oxygen relative to stoichiometry;
   maintaining a temperature of the glass melt between 1200° C. and 1500° C. and a residence time of the glass melt between 1 hour and 10 hours; and
   discharging a flint molten glass from the submerged combustion melter at a specific throughput rate that ranges from 2 tons per day per meter squared of cross-sectional area of the submerged combustion melter [tons/day/m$^2$] to 25 tons/day/m$^2$, wherein the flint molten glass discharged from the submerged combustion melter has a density of 0.75 gm/cm$^3$ to 1.5 gm/cm$^3$; and refining the flint molten glass discharged from the submerged combustion melter to obtain a refined molten glass, the refined molten glass having a density that ranges from 2.3 gm/cm$^3$ to 2.5 gm/cm$^3$.

14. The method set forth in claim 13, wherein the oxygen-to-fuel ratio ranges from 15% excess oxygen relative to stoichiometry to 25% excess oxygen relative to stoichiometry.

15. The method set forth in claim 13, wherein the temperature of the glass melt ranges from 1330° C. to 1380° C.

16. The method set forth in claim 13, wherein the residence time of the glass melt ranges from 2 hours to 4 hours.

17. The method set forth in claim 13, wherein the specific throughput rate of the flint molten glass discharged from the submerged combustion melter ranges from 6 tons/day/m$^2$ to 12 tons/day/m$^2$.

18. The method set forth in claim 13, wherein the oxygen-to-fuel ratio ranges from 15% excess oxygen relative to stoichiometry to 25% excess oxygen relative to stoichiometry, the temperature of the glass melt ranges from 1330° C. to 1380° C., the residence time of the glass melt ranges from 2 hours to 4 hours, and the specific throughput rate of the flint molten glass discharged from the submerged combustion melter ranges from 6 tons/day/m$^2$ to 12 tons/day/m$^2$.

19. The method set forth in claim 13, further comprising:
thermally conditioning the refined molten glass to produce conditioned molten glass; and
forming at least one glass container from the conditioned molten glass.

20. The method set forth in claim 19, wherein the glass container meets flint glass specifications of a dominant wavelength that lies between 572 nm and 578 nm, a brightness above 50%, and a purity below 16%.

21. The method set forth in claim 13, wherein the flint molten glass discharged from the submerged combustion melter has a redox value of 0.4 or less.

22. The method set forth in claim 13, wherein the vitrified feed material includes up to 80 wt % cullet.

23. A method comprising:
introducing a vitrifiable feed material into a glass melt contained within an interior reaction chamber of a submerged combustion melter, the submerged combustion melter comprising one or more submerged burners;
discharging combustion products from the one or more submerged burners directly into the glass melt, the one or more submerged burners combusting a combustible gas mixture that comprises fuel and oxygen, and wherein an oxygen-to-fuel ratio of the combustible gas mixture ranges from stoichiometry to 30% excess oxygen relative to stoichiometry;
maintaining a temperature of the glass melt between 1200° C. and 1500° C.;
maintaining a residence time of the glass melt between 1 hour and 10 hours;
discharging a flint molten glass from a molten glass outlet of the submerged combustion melter at a specific throughput rate that ranges from 2 tons per day per meter squared of cross-sectional area of the interior reaction chamber at a height of the molten glass outlet [tons/day/m$^2$] to 25 tons/day/m$^2$; and
forming a glass container from the flint molten glass, wherein the glass container, when solidified, is visually transparent as demonstrated by a dominate wavelength between 572 nm and 578 nm, a brightness above 50%, and a purity below 16%.

* * * * *